Oct. 18, 1927.
C. E. TANNEWITZ
1,645,552
BAND SAW WHEEL
Filed Aug. 6, 1926
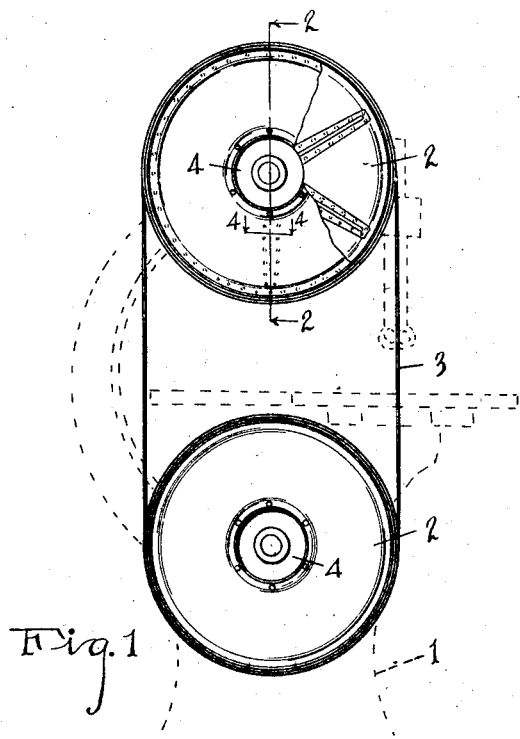
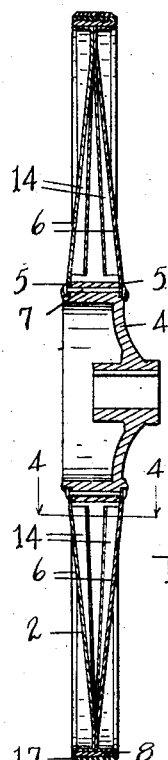
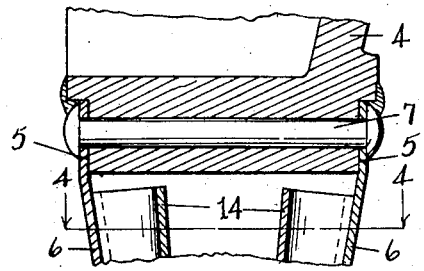
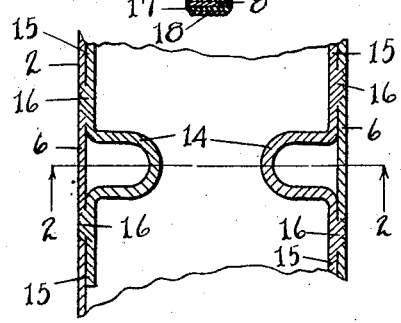
INVENTOR
Carl E. Tannewitz
BY Chappell & Earl
ATTORNEYS Patented Oct. 18, 1927.

1,645,552

UNITED STATES PATENT OFFICE.

CARL E. TANNEWITZ, OF GRAND RAPIDS, MICHIGAN.

BAND-SAW WHEEL.

Application filed August 6, 1926. Serial No. 127,584.

The main objects of this invention are,

First, to provide an improved band saw wheel which is made largely of sheet metal and is of disk type so that it does not set up an objectionable breeze or current of air when in use, it being of comparatively light material and at the same time very strong and rigid.

Second, to provide a band saw wheel with a yielding periphery or facing which is very securely retained upon the rim of the wheel and one which is very durable.

Further objects relating to details and economies of construction and operation will appear from the detailed description to follow. The invention is defined and pointed out in the claims.

A structure which is a preferred embodiment of the invention is illustrated in the accompanying drawing, forming a part of this application, in which:

Fig. 1 is a side elevation of a band saw embodying the features of my invention, only such portions of the machine being illustrated as are deemed necessary to disclose the application of my improvements, and parts being shown in dotted lines, one of the band saw wheels being partially broken away to show structural details.

Fig. 2 is a section through one of the band saw wheels on line 2—2 of Figs. 1 and 4.

Fig. 3 is a fragmentary section corresponding to that of Fig. 2, enlarged to better illustrate the structure.

Fig. 4 is a fragmentary section taken on line 4—4 of Figs. 1, 2 and 3.

Referring to the drawing, 1 represents the framework of a band saw machine, 2, 2 the band saw wheels generally, and 3 the band saw. As the band saw wheels are duplicates, a description of one will suffice.

My improved band saw comprises a hub 4 shouldered at 5 to receive the inner edges of the disks 6. These disks are fitted into the shoulders and secured to the hub by means of rivets 7. The metal rim 8 has a plurality of peripheral circumferential corrugation-like grooves 9. The disks 6 have outturned flanges 10 at their outer edges fitting within and secured to the rim by spot welding, as indicated at 11. This in the embodiment illustrated has portions 12 adjacent their flanges lying in parallel contacting relation and secured together by spot welding, as indicated at 13.

The disks are reinforced by radially disposed reinforcing members 14, these members being of channel cross section and having outturned flanges 15 lying against the inner sides of the disks and secured thereto by spot welding, as indicated at 16. These reinforcing members are tapered outwardly until their channels merge into their flanges, as shown in the drawing.

I provide a rubber facing for the rim consisting of an inner layer 17 of hard rubber and an outer layer 18 of soft rubber. The facing is secured by vulcanizing the inner hard rubber layer taking a firm hold of the rim, while the outer soft rubber is securely united with the layer 17. By this arrangement I provide a rubber tire which is capable of standing great speeds without loosening or coming off the metal rim, and an effective cushion is provided for the blade. The vulcanizing of the relatively hard rubber appears to cause it to shrink and grip the metal rim, while the soft outer layer becomes firmly united with the hard rubber facing and furnishes a tough resilient cushion for the saw blade, which so far as applicant is aware has not been practical to do where the resilient rubber is mounted upon or secured directly to the metal rim.

I have illustrated and described my improvements in an embodiment which I have found very practical. I have not attempted to illustrate or describe certain modifications and adaptations which I contemplate, as I believe this disclosure will enable those skilled in the art to embody or adapt my improvements as may be desired.

Having thus described my invention, what I claim as new and desire to secure by Letters Patent is:

1. The combination with a band saw, of a pair of coacting wheels each comprising a hub, a metal rim, a pair of outwardly converging disks mounted upon said hub and having outturned flanges at their outer edges fitting within and spot welded to the inner side of said rim, said disks having annular portions adjacent their flanges disposed in parallel contacting relation and secured together by spot welding, and radially disposed reinforcing members of channel cross section disposed on the inner side of the disks and having laterally projecting flanges secured to the disks by spot welding, said reinforcing members being tapered outwardly until the channels thereof merge into their said flanges.

2. The combination in a band saw, of a band saw wheel comprising a hub, a metal rim, a pair of outwardly converging disks mounted upon said hub and having outturned flanges at their outer edges fitting within and spot welded to the inner side of said rim, and radially disposed reinforcing members of channel cross section disposed on the inner side of the disks and having laterally projecting flanges secured to the disks by spot welding, said reinforcing members being tapered outwardly until the channels thereof merge into their said flanges.

3. The combination with a band saw, of a pair of coacting wheels each comprising a hub, a metal rim, a pair of outwardly converging disks mounted upon said hub and secured to said rim, and radially disposed reinforcing members of channel cross section disposed on the inner side of the disks and having laterally projecting flanges secured to the disks by spot welding, said reinforcing members being tapered outwardly until the channels thereof merge into their said flanges.

4. The combination in a band saw, of a band saw wheel comprising a hub, a metal rim, a pair of outwardly converging disks mounted on said hub and secured to said rim, and radially disposed reinforcing members of channel cross section disposed on the inner side of said disks and having laterally disposed flanges at their edges secured to said disks by spot welding, the channel portions of said reinforcing members being outwardly tapered.

In witness whereof I have hereunto set my hand.

CARL E. TANNEWITZ.